US010811728B2

(12) United States Patent
Desilani et al.

(10) Patent No.: US 10,811,728 B2
(45) Date of Patent: Oct. 20, 2020

(54) LITHIUM-SULPHUR CELL

(71) Applicants: Oxis Energy Limited, Abingdon Oxfordshire (GB); Arkema France, Colombes (FR)

(72) Inventors: Sebastian Desilani, Abingdon (GB); Ashley Cooke, Abingdon (GB); Gregory Schmidt, Mornant (FR)

(73) Assignees: Oxis Energy Ltd., Oxfordshire (GB); Arkema France, Colombes (FR)

( * ) Notice: Subject to any disclaimer, the term of this patent is extended or adjusted under 35 U.S.C. 154(b) by 0 days.

(21) Appl. No.: 15/315,133

(22) PCT Filed: May 21, 2015

(86) PCT No.: PCT/GB2015/051501
§ 371 (c)(1),
(2) Date: Nov. 30, 2016

(87) PCT Pub. No.: WO2015/181527
PCT Pub. Date: Dec. 3, 2015

(65) Prior Publication Data
US 2017/0200977 A1 Jul. 13, 2017

(30) Foreign Application Priority Data
May 30, 2014 (EP) .................................... 14170598

(51) Int. Cl.
*H01M 10/0525* (2010.01)
*H01M 10/0569* (2010.01)
*H01M 4/38* (2006.01)
*H01M 4/58* (2010.01)
*H01M 10/052* (2010.01)
*H01M 4/62* (2006.01)
*H01M 2/16* (2006.01)

(52) U.S. Cl.
CPC ......... *H01M 10/0569* (2013.01); *H01M 4/38* (2013.01); *H01M 4/382* (2013.01); *H01M 4/5815* (2013.01); *H01M 4/625* (2013.01); *H01M 10/052* (2013.01); *H01M 10/0525* (2013.01); *H01M 2/1653* (2013.01); *H01M 2300/0028* (2013.01)

(58) Field of Classification Search
CPC ...... H01M 10/0525; H01M 4/38; H01M 4/62; H01M 2300/0028; H01M 10/0569; H01M 4/625; H01M 4/382
See application file for complete search history.

(56) References Cited

U.S. PATENT DOCUMENTS

| | | |
|---|---|---|
| 3,030,720 A | 4/1962 | Osswald et al. |
| 3,185,590 A | 5/1965 | Mayer et al. |
| 3,578,500 A | 5/1971 | Maricle et al. |
| 3,639,174 A | 2/1972 | Kegelman |
| 3,721,113 A | 3/1973 | Hovsepian |
| 3,778,310 A | 12/1973 | Garth |
| 3,877,983 A | 4/1975 | Hovsepian |
| 3,907,591 A | 9/1975 | Lauck |
| 3,907,597 A | 9/1975 | Mellors |
| 3,939,010 A | 2/1976 | Coleman et al. |
| 3,951,688 A | 4/1976 | Pankow et al. |
| 4,060,674 A | 11/1977 | Klemann et al. |
| 4,104,451 A | 8/1978 | Klemann et al. |
| 4,118,550 A | 10/1978 | Koch |
| 4,154,906 A | 5/1979 | Bubnick et al. |
| 4,163,829 A | 8/1979 | Kronenberg |
| 4,218,523 A | 8/1980 | Kalnoki-Kis |
| 4,252,876 A | 2/1981 | Koch |
| 4,303,748 A | 12/1981 | Armand et al. |
| 4,318,430 A | 3/1982 | Perman |
| 4,410,609 A | 10/1983 | Peled et al. |
| 4,499,161 A | 2/1985 | Foos |
| 4,503,234 A | 3/1985 | Huwiler et al. |
| 4,503,378 A | 3/1985 | Jones et al. |
| 4,550,064 A | 10/1985 | Yen et al. |
| 4,690,877 A | 9/1987 | Gabano et al. |
| 4,725,927 A | 2/1988 | Morimoto et al. |
| 4,740,436 A | 4/1988 | Kobayashi et al. |
| 5,079,109 A | 1/1992 | Takami et al. |
| 5,219,684 A | 6/1993 | Wilkinson et al. |
| 5,368,958 A | 11/1994 | Hirai et al. |
| 5,460,905 A | 10/1995 | Skotheim |
| 5,462,566 A | 10/1995 | Skotheim |
| 5,523,179 A | 6/1996 | Chu |
| 5,529,860 A | 6/1996 | Skotheim et al. |

(Continued)

FOREIGN PATENT DOCUMENTS

| | | |
|---|---|---|
| CN | 1389948 | 1/2003 |
| CN | 103247822 | 8/2013 |

(Continued)

OTHER PUBLICATIONS

WO 2013045561MT.*
CN103531839 MT (Year: 2014).*
Aurbach et al., "A Short Review of Failure Mechanism of Lithium Metal and Lithiated Graphite Anodes in Liquid Electrolyte Solutions", Solid State Lonics, 2002, vol. 148, p. 405-416.
Bates et al., "Solvent Effects on Acid-Base Behavior: Five Uncharged Acids in Water—Sulfolane Solvents", 1976, Journal of Solution Chemistry, vol. 5, No. 3, p. 213-222.
Chagnes et al., "Butyrolactone-Ethylene Carbonate Based Electrolytes for Lithium Ion Batteries", Jul. 2003, Journal of Applied Electrochemistry, 33, p. 589-595.

(Continued)

*Primary Examiner* — Alexander Usyatinsky
(74) *Attorney, Agent, or Firm* — Kowert, Hood, Munyon, Rankin & Goetzel, P.C.; Mark R. DeLuca

(57) ABSTRACT

The present invention relates to a lithium-sulphur cell comprising an anode comprising lithium metal or lithium metal alloy; a cathode comprising a mixture of electroactive sulphur material and solid electroconductive material; and a liquid electrolyte comprising at least one lithium salt and a solvent comprising a dinitrile.

16 Claims, 1 Drawing Sheet

(56) References Cited

U.S. PATENT DOCUMENTS

| | | |
|---|---|---|
| 5,532,077 A | 7/1996 | Chu |
| 5,582,623 A | 12/1996 | Chu |
| 5,587,253 A | 12/1996 | Gozdz et al. |
| 5,648,187 A | 7/1997 | Skotheim |
| 5,744,262 A | 4/1998 | Cheng et al. |
| 5,789,108 A | 8/1998 | Chu |
| 5,797,428 A | 8/1998 | Miller |
| 5,814,420 A | 9/1998 | Chu |
| 5,919,587 A | 7/1999 | Mukherjee et al. |
| 5,961,672 A | 10/1999 | Skotheim et al. |
| 5,962,171 A | 10/1999 | Boguslaysky et al. |
| 6,030,720 A | 2/2000 | Chu et al. |
| 6,051,342 A | 4/2000 | Hamano et al. |
| 6,056,185 A | 5/2000 | Daroux et al. |
| 6,090,504 A | 7/2000 | Sung et al. |
| 6,117,590 A | 9/2000 | Skotheim et al. |
| 6,162,562 A | 12/2000 | Tsuji et al. |
| 6,174,621 B1 | 1/2001 | Skotheim et al. |
| 6,201,100 B1 | 3/2001 | Gorkovenko et al. |
| 6,210,831 B1 | 4/2001 | Gorkovenko et al. |
| 6,245,465 B1 | 6/2001 | Angell et al. |
| 6,302,928 B1 | 10/2001 | Xu et al. |
| 6,319,633 B1 | 11/2001 | Ikeda et al. |
| 6,344,293 B1 | 2/2002 | Geronov |
| 6,358,643 B1 | 3/2002 | Katz |
| 6,376,123 B1 | 4/2002 | Chu |
| 6,524,742 B1 | 2/2003 | Emanuel et al. |
| 6,537,704 B1 | 3/2003 | Akashi et al. |
| 6,544,691 B1 | 4/2003 | Guidotti |
| 6,613,480 B1 | 9/2003 | Hwang et al. |
| 6,632,573 B1 | 10/2003 | Nimon et al. |
| 6,706,449 B2 | 3/2004 | Mikhaylik et al. |
| 6,733,924 B1 | 5/2004 | Skotheim et al. |
| 6,797,428 B1 | 9/2004 | Skotheim et al. |
| 7,108,942 B1 | 9/2006 | Gan et al. |
| 7,250,233 B2 | 7/2007 | Choi et al. |
| 7,335,440 B2 | 2/2008 | Aamodt et al. |
| 7,354,680 B2 | 4/2008 | Mikhaylik et al. |
| 2001/0008736 A1 | 7/2001 | Fanta et al. |
| 2001/0019797 A1 | 9/2001 | Kezuka et al. |
| 2002/0022181 A1 | 2/2002 | Tsujioka et al. |
| 2002/0034688 A1 | 3/2002 | Chu et al. |
| 2002/0039677 A1 | 4/2002 | Iwamoto et al. |
| 2002/0045101 A1 | 4/2002 | Hwang et al. |
| 2002/0045102 A1 | 4/2002 | Jung et al. |
| 2002/0102466 A1 | 8/2002 | Hwang et al. |
| 2002/0160258 A1 | 10/2002 | Lee et al. |
| 2002/0160263 A1 | 10/2002 | Corrigan et al. |
| 2002/0168574 A1 | 11/2002 | Ahn et al. |
| 2002/0192557 A1 | 12/2002 | Choi et al. |
| 2003/0073005 A1 | 4/2003 | Kim et al. |
| 2003/0111512 A1 | 6/2003 | O'Connell et al. |
| 2003/0157411 A1 | 8/2003 | Jung et al. |
| 2003/0175596 A1 | 9/2003 | Park et al. |
| 2003/0180611 A1 | 9/2003 | Mikhaylik et al. |
| 2003/0190530 A1 | 10/2003 | Yang et al. |
| 2003/0232244 A1 | 12/2003 | Birke et al. |
| 2004/0002002 A1 | 1/2004 | Mitzuta et al. |
| 2004/0028999 A1 | 2/2004 | LaLiberte |
| 2004/0029014 A1 | 2/2004 | Hwang |
| 2004/0048164 A1 | 3/2004 | Jung et al. |
| 2004/0053129 A1 | 3/2004 | Jung et al. |
| 2004/0072066 A1 | 4/2004 | Cho et al. |
| 2004/0091776 A1 | 5/2004 | Hwang |
| 2004/0096744 A1 | 5/2004 | Sadamitsu et al. |
| 2004/0096750 A1 | 5/2004 | Kim et al. |
| 2004/0101753 A1 | 5/2004 | Hwang |
| 2004/0137330 A1 | 7/2004 | Lee et al. |
| 2004/0157132 A1 | 8/2004 | Kim et al. |
| 2004/0179328 A1 | 9/2004 | Ando et al. |
| 2004/0219428 A1 | 11/2004 | Nagayama |
| 2004/0222768 A1 | 11/2004 | Moore et al. |
| 2004/0258996 A1 | 12/2004 | Kim et al. |
| 2005/0017684 A1 | 1/2005 | Brecht |
| 2005/0136327 A1 | 6/2005 | Miyake et al. |
| 2005/0156575 A1 | 7/2005 | Mikhaylik |
| 2005/0175903 A1 | 8/2005 | Kim et al. |
| 2005/0221192 A1 | 10/2005 | Hennige et al. |
| 2005/0238956 A1 | 10/2005 | Lee |
| 2005/0244693 A1 | 11/2005 | Strutt et al. |
| 2006/0024579 A1 | 2/2006 | Kolosnitsyn et al. |
| 2006/0051643 A1 | 3/2006 | Sarkar et al. |
| 2006/0105233 A1 | 5/2006 | Morita |
| 2006/0121355 A1 | 6/2006 | Kolosnitsyn et al. |
| 2006/0177741 A1 | 8/2006 | Kolosnitsyn et al. |
| 2006/0204856 A1 | 9/2006 | Ryu et al. |
| 2006/0208701 A1 | 9/2006 | Mikhaylik |
| 2006/0234126 A1 | 10/2006 | Kolosnitsyn et al. |
| 2006/0238203 A1 | 10/2006 | Kelley et al. |
| 2006/0292451 A1 | 12/2006 | Lee et al. |
| 2007/0072076 A1 | 3/2007 | Kolosnitsyn et al. |
| 2007/0281210 A1 | 12/2007 | Kolosnitsyn et al. |
| 2008/0038645 A1 | 2/2008 | Kolosnitsyn et al. |
| 2008/0060189 A1 | 3/2008 | Daidoji et al. |
| 2008/0100264 A1 | 5/2008 | Kolosnitsyn et al. |
| 2008/0160407 A1 | 7/2008 | Ishii et al. |
| 2008/0193835 A1 | 8/2008 | Mikhaylik et al. |
| 2009/0027831 A1 | 1/2009 | Tasaki et al. |
| 2009/0053565 A1 | 2/2009 | Iacovelli |
| 2009/0111029 A1 | 4/2009 | Lee et al. |
| 2009/0246626 A1 | 10/2009 | Tasaki et al. |
| 2009/0317717 A1 | 12/2009 | Ryu et al. |
| 2010/0129724 A1 | 5/2010 | Kolosnitsyn et al. |
| 2010/0231168 A1 | 9/2010 | Kolosnitsyn et al. |
| 2010/0261048 A1 | 10/2010 | Kim et al. |
| 2010/0273048 A1 | 10/2010 | Machida et al. |
| 2011/0050178 A1 | 3/2011 | Kim et al. |
| 2011/0059361 A1 | 3/2011 | Wilkening et al. |
| 2011/0123866 A1 | 5/2011 | Pan et al. |
| 2011/0151317 A1 | 6/2011 | Giroud et al. |
| 2012/0225352 A1* | 9/2012 | Abouimrane ......... H01M 4/136 |
| | | 429/211 |
| 2012/0282530 A1 | 11/2012 | Chiang et al. |
| 2012/0293114 A1 | 11/2012 | Murochi et al. |
| 2012/0315553 A1 | 12/2012 | Fuminori et al. |
| 2013/0011717 A1 | 1/2013 | Yotsumoto |
| 2013/0063074 A1* | 3/2013 | Lin et al. ............ H02J 7/00047 |
| | | 320/107 |
| 2013/0122334 A1* | 5/2013 | Visco ..................... H01M 4/38 |
| | | 429/72 |
| 2013/0187466 A1 | 7/2013 | Sakai et al. |
| 2013/0307485 A1 | 11/2013 | He et al. |
| 2014/0009117 A1 | 1/2014 | Ishii et al. |
| 2014/0079989 A1 | 3/2014 | Janakiraman et al. |
| 2014/0212755 A1* | 7/2014 | Wu ....................... H01M 4/625 |
| | | 429/221 |
| 2014/0272610 A1* | 9/2014 | Amine ................. H01M 4/583 |
| | | 429/405 |
| 2014/0377667 A1 | 12/2014 | Roschenthaler et al. |
| 2015/0084603 A1 | 3/2015 | Thillaiyan et al. |
| 2015/0147656 A1 | 5/2015 | Kogetsu et al. |
| 2015/0234014 A1 | 8/2015 | Moganty et al. |

FOREIGN PATENT DOCUMENTS

| | | |
|---|---|---|
| CN | 103531839 | 1/2014 |
| EP | 710995 | 5/1996 |
| EP | 764489 | 3/1997 |
| EP | 924783 | 6/1999 |
| EP | 1176659 | 1/2002 |
| EP | 1178555 | 2/2002 |
| EP | 1320143 | 6/2003 |
| EP | 1400996 | 3/2004 |
| EP | 1420475 | 5/2004 |
| EP | 1865520 | 12/2007 |
| EP | 1962364 | 8/2008 |
| EP | 2023461 | 2/2009 |
| EP | 2026402 | 2/2009 |
| EP | 2259376 | 12/2010 |
| FR | 2991104 | 11/2013 |
| GB | 2084391 | 4/1982 |
| GB | 2200068 | 7/1988 |
| GB | 2430542 | 3/2007 |

(56) References Cited

FOREIGN PATENT DOCUMENTS

| | | |
|---|---|---|
| JP | 59-194361 | 11/1984 |
| JP | 63-081767 | 4/1988 |
| JP | 64-107467 | 4/1989 |
| JP | 01-124969 | 5/1989 |
| JP | 04-217826 | 8/1992 |
| JP | 06-343233 | 12/1994 |
| JP | 08-069812 | 3/1996 |
| JP | 08-138650 | 5/1996 |
| JP | 08-138742 | 5/1996 |
| JP | 08-298229 | 11/1996 |
| JP | 08-298230 | 11/1996 |
| JP | 09-027328 | 1/1997 |
| JP | 09-147913 | 6/1997 |
| JP | 10-284076 | 10/1998 |
| JP | 11-067261 | 3/1999 |
| JP | 11-273729 | 10/1999 |
| JP | 2001-167751 | 6/2001 |
| JP | 2002-075446 | 3/2002 |
| JP | 2002-252036 | 9/2002 |
| JP | 2005-071641 | 3/2005 |
| JP | 2005-108523 | 4/2005 |
| JP | 2005-108724 | 4/2005 |
| JP | 2005-005215 | 6/2005 |
| JP | 2005-243342 | 9/2005 |
| JP | 2006-134785 | 5/2006 |
| JP | 2007-173615 | 7/2007 |
| JP | 2009-087728 | 4/2009 |
| JP | 2009-187674 | 8/2009 |
| JP | 2010-251197 | 11/2010 |
| JP | 2010-262864 | 11/2010 |
| JP | 2011-108469 | 6/2011 |
| JP | 2011-124024 | 6/2011 |
| JP | 2011-192574 | 9/2011 |
| JP | 2013-042598 | 2/2013 |
| KR | 10-2002-0089134 | 11/2002 |
| KR | 10-2003-0368753 | 4/2003 |
| KR | 10-2003-0056497 | 7/2003 |
| KR | 10-2011-0024707 | 3/2011 |
| WO | 2001-047088 | 6/2001 |
| WO | 2006-050117 | 5/2006 |
| WO | 2007-111988 | 10/2007 |
| WO | 2007-132994 | 11/2007 |
| WO | WO 2013045561 | * 4/2013 |

OTHER PUBLICATIONS

Chang et al., "Binary Electrolyte Based on Tetra (ethylene glycol) Dimethyl Ether and 1,3-dioxolane for Lithium-Sulphur Battery", J. Power Sources, 2002, vol. 112, p. 452-460.

Cowie et al. "Ion Conduction in Macroporous Polyethylene Film Doped With Electrolytes" Solid State Ionics 109 (1998) 139-144.

Fujinaga et al. "Electrochemical Reduction of Elemental Sulphur in Acetonitrile", Bull Chem. Soc. Jpn. 1980, vol. 53, p. 2851-2855.

Jeon et al. Solvent-Free Polymer Electrolytes Based on Thermally Annealed Porous P(VdF-HFP)/P(EO-EC) Membranes.

Kolosnitsyn "Physicochemical and Electrochemical Properties of Sulfolane Solutions of Lithium Salts", Russian Journal of Electrochemistry, May 2008, vol. 44(5), p. 575-578.

Komaba et al., "Inorganic Electrolyte Additives to Supress the Degradation of Graphite Anodes by Dissolved Mn(II) for Lithium Ion Batteries", Mar. 2003, Journal of Power Sources, 1190121, p. 378-382.

Levillain et al., "On the Understanding of the Reduction of Sulphur (S8) in Dimethylformamide (DMF)", J. of Electroanalytical Chemistry, 1997, vol. 420, p. 167-177.

Nazri et al., "Lithium Batteries: Science and Technology", 2003, p. 509-573, Hardcover, ISBN: 978-1-4020-7628-2.

Paris et al. "Electrochemical Reduction of Sulphur in Dimethylacetamide", Electrochimica Acta, 1981, vol. 26, No. 12, p. 1823-1829.

Peled et al., "Rechargeable Lithium-Sulphur Battery (extended abstract)", J. of Power Sources, 1989, vol. 26, p. 269-271.

Peled et al., "Lithium-Sulphur Battery: Evaluation of Dioxolane-Based Electrolytes", J. Electrochem Soc., 1989, vol. 136, No. 6, p. 1621-1625.

Rauh et al., "Formation of Lithium Polysulphides in Aprotic Media", J. Inorg. Nucl Chem, 1977, vol. 39, p. 1761-1766.

Rauh et al., "A Lithium/Dissolved Sulphur Battery with an Organic Electrolyte", J. Electrochem Soc., 1979, vol. 126, No. 4, p. 523-527.

Suo et al. "A New Class of Solvent-in-Salt Electrolyte for High-Energy Rechargeable Metallic Lithium Batteries" Nature Communications, 2013, vol. 4, p. 1481.

Tobishima et al., "Study on the Reduction Species of Sulphur by Alkali Metals in Nonaqueous Solvents", Electrochimica Acta, 1997, vol. 42, No. 6, p. 1019-1029.

Ultralife Batteries Inc. "Transportation Regulations for Lithium, Lithium Ion and Polymer Cells and Batteries", Rev. H, Dec. 18, 2003.

Yamin et al., "Lithium Sulphur Battery Oxidation/Reduction Mechanisms of Polysulphides in THF Solution", J. Electrochem Soc. 1988, vol. 135, No. 5, p. 1045-1048.

International Search Report, Application No. PCT/GB2015/051501, dated Aug. 20, 2015.

Written Opinion, Application No. PCT/GB2015/051501, dated Aug. 20, 2015.

International Preliminary Report on Patentability, Application No. PCT/GB2015/051501, dated Dec. 6, 2016.

Office Action for Chinese Patent Application No. 2015800290632 dated Jun. 2019.

* cited by examiner

LITHIUM-SULPHUR CELL

The present invention relates to a lithium-sulphur cell.

BACKGROUND

A typical lithium-sulphur cell comprises an anode (negative electrode) formed from lithium metal or a lithium metal alloy, and a cathode (positive electrode) formed from elemental sulphur or other electroactive sulphur material. The sulphur or other electroactive sulphur-containing material may be mixed with an electrically conductive material, such as carbon, to improve its electrical conductivity. Typically, the carbon and sulphur are ground and then mixed with a solvent and binder to form a slurry. The slurry is applied to a current collector and then dried to remove the solvent. The resulting structure is calendared to form a composite structure, which is cut into the desired shape to form a cathode. A separator is placed on the cathode and a lithium anode placed on the separator. Electrolyte is introduced into the cell to wet the cathode and separator. The electrolyte typically includes an electrolyte salt dissolved in a solvent.

Lithium-sulphur cells are secondary cells, and may be recharged by applying an external current to the cell. Rechargeable cells of this type have a wide range of potential applications. Important considerations when developing lithium-sulphur secondary cells include gravimetric energy, cycle life and ease of cell assembly.

When a lithium-sulphur cell is discharged, the sulphur in the cathode is reduced in two-stages. In the first stage, the electroactive sulphur material (e.g. elemental sulphur) is reduced to polysulphide species, $S_n^{2-}$ (n≥2). These species are generally soluble in the electrolyte. In the second stage of discharge, the polysulphide species are reduced to lithium sulphide, $Li_2S$, which is insoluble. When the cell is charged, the two-stage mechanism occurs in reverse, with the lithium sulphide being oxidised to lithium polysulphide and thereafter to lithium and sulphur.

As well as being a suitable solvent for the electrolyte salt, a solvent for use in lithium sulphur cell should not react with the lithium metal anode and act as a good solvent for the polysulphide species formed upon discharge. As such, the solvent requirements of lithium-sulphur cells are significantly more complex than those of a lithium-ion cell because of the multi-dimensionality introduced at least in part by the intermediate species formed during the charge and discharge of a lithium sulphur cell. Many solvents, such as carbonates, that are typically employed in lithium-ion cells are unsuitable for use in lithium-sulphur cells because they react with the polysulphides formed upon discharge, particularly at high sulphur loadings. The performance of an electrolyte solvent in a lithium-sulphur cell, therefore, cannot be predicted from its performance as an electrolyte solvent in a lithium-ion cell.

BREIF DESCRIPTION OF THE DRAWINGS

DESCRIPTION

Figure 1:
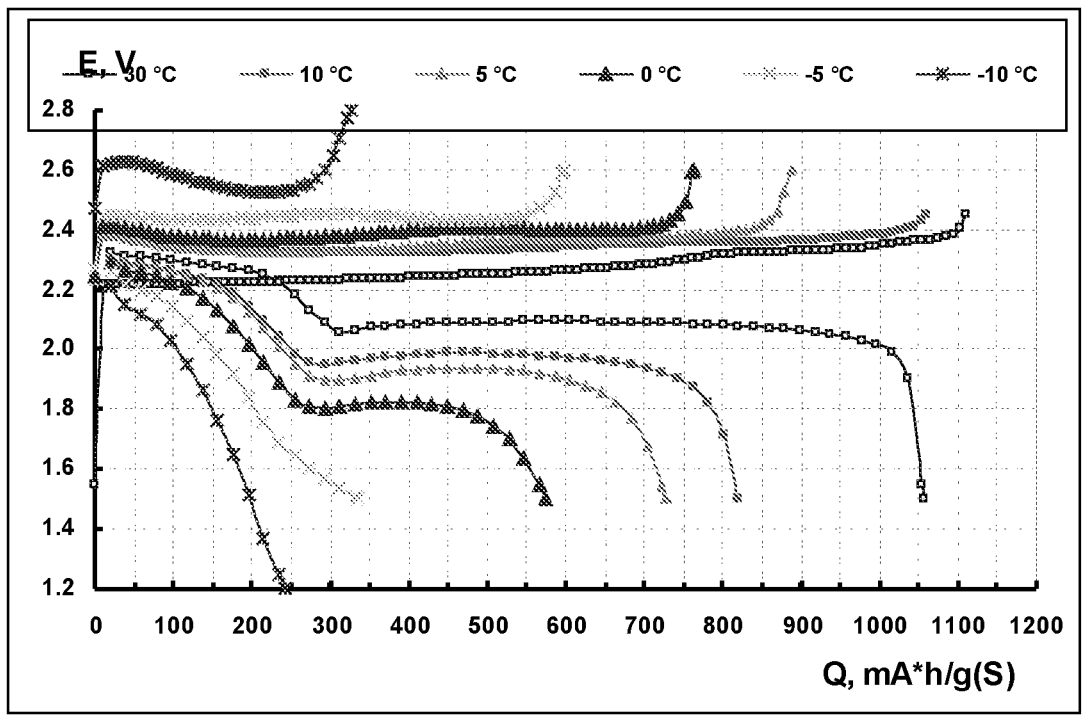
FIG. 1 depicts charge-discharge curves of a lithium sulpur cell formed using lithium LiTDI (4,5-dicyano-2-(trifluoromethyl)imidazolium) in 2-methylglutaronitrile as an electrolyte cycled at temperatures ranging from -10 to 30 degrees C.

Before particular examples of the present invention are described, it is to be understood that the present disclosure is not limited to the particular cell, method or material disclosed herein. It is also to be understood that the terminology used herein is used for describing particular examples only and is not intended to be limiting, as the scope of protection will be defined by the claims and equivalents thereof.

In describing and claiming the cell and method of the present invention, the following terminology will be used: the singular forms "a", "an", and "the" include plural forms unless the context clearly dictates otherwise. Thus, for example, reference to "an anode" includes reference to one or more of such elements.

According to one aspect of the present invention, there is provided a lithium-sulphur cell comprising:
 an anode comprising lithium metal or lithium metal alloy;
 a cathode comprising a mixture of electroactive sulphur material and solid electroconductive material; and
 a liquid electrolyte comprising at least one lithium salt and a solvent comprising a dinitrile.

In embodiments of the present invention, it has been found that, by using a dinitrile as an electrolyte solvent, the gravimetric energy of the lithium sulphur cell can be increased. It has also been found that electrolytes formed using dinitriles as solvent may also have favourable viscosity characteristics. Accordingly, such electrolytes can be applied to the cathode in a convenient and efficient manner, facilitating efficient and convenient cell assembly. In embodiments of the present invention, it has also been found that the cycle life of a lithium sulphur cell may also be improved by using a dinitrile as a solvent in the lithium sulphur cell.

In embodiments of the present invention, it has also been found that the low temperature performance of the lithium sulphur cell may be improved using a dinitrile as a solvent. For example, in certain embodiments, the electrolyte may remain in liquid form at temperatures below 0 degrees C., for instance, below -10 degrees C. (e.g. up to -30 degrees C.)

The dinitrile may have the formula (I):

wherein:
n is an integer 2 to 10, and
in each —$CR_1 R_2$— linkage, $R_1$ and $R_2$ are each independently selected from H, —OH, amine, amide, ether and a $C_1$ to $C_6$ alkyl group.

For the avoidance of doubt, each —$CR_1R_2$— linkage may be the same or different. In one embodiment, one of the —$CR_1 R_2$— linkages is different from the remainder of the —$CR_1 R_2$— linkages in the dinitrile. The —$CR_1 R_2$— linkage that is different from the remaining —$CR_1 R_2$— linkages may be present adjacent a CN group.

Where $R_1$ and/or $R_2$ is an amine, the amine may have the formula —$NR_aR_b$, where each of $R_a$ and $R_b$ is independently H or a hydrocarbyl group. Suitable hydrocarbyl groups include alkyl groups, for example, $C_1$ to $C_4$ alkyl (e.g.

methyl, ethyl, propyl or butyl). For example, —NR$_a$R$_b$ may be —NH$_2$ or —N(CH$_3$)$_2$. The amine may be a primary, secondary or tertiary amine group.

Where R$_1$ and/or R$_2$ is an amide, the amide may be —NR$_a$C(O)R$_b$, where each of R$_a$ and R$_b$ is independently H or a hydrocarbyl group. Suitable hydrocarbyl groups include alkyl groups, for example, C$_1$ to C$_4$ alkyl (e.g. methyl, ethyl, propyl or butyl). For example, —NR$_a$C(O)R$_b$ may be —NHC(O)CH$_3$.

Where R$_1$ and/or R$_2$ is an ether group, the ether may have the formula —OR$_c$, where R$_c$ is a hydrocarbyl group. Suitable hydrocarbyl groups include alkyl groups, for example, C$_1$ to C$_4$ alkyl (e.g. methyl, ethyl, propyl or butyl). For example, the —OR$_c$ group may be —OCH$_3$.

Where R$_1$ and/or R$_2$ is an alkyl group, the alkyl group may be a C$_1$ to C$_6$ alkyl group, for example, methyl, ethyl, propyl, i-propyl, n-butyl, i-butyl and t-butyl, pentyl or hexyl.

In one embodiment, the dinitrile of formula (I) includes at least 2, for example, 2 to 4 —CR$_1$R$_2$— linkages that are of the formula —CH$_2$—. Optionally, the dinitrile of formula (I) may also include one or two —CR$_1$R$_2$— linkages of the formula —CHR$_2$. The —CHR$_2$— linkage may be adjacent a —CN group.

In one embodiment, the dinitrile has the formula (II):

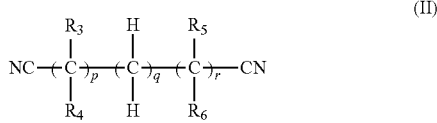

wherein:
p is 0 or 1,
q is an integer of 1 to 9,
r is 0 or 1, and
R$_3$, R$_4$, R$_5$ and R$_6$ are each independently selected from H and a C$_1$ to C$_6$ alkyl group (e.g. methyl, ethyl, propyl, i-propyl, n-butyl, i-butyl and t-butyl, pentyl or hexyl, preferably, methyl).

Preferably, at least one of R$_3$ and R$_4$ is H, and at least one of R$_5$ and R$_6$ is H. Preferably, at least one of R$_3$, R$_4$, R$_5$ and R$_6$ is a C$_1$ to C$_6$ alkyl group. In one embodiment, R$_3$ is H; R$_5$ is H; and at least one of R$_4$ and R$_6$ is a C$_1$ to C$_6$ alkyl group. For example, in one embodiment, R$_3$ is H; R$_5$ is H; R$_4$ is H and R$_6$ is a C$_1$ to C$_6$ alkyl group.

In one embodiment, p is 0 and r is 1. In one embodiment, q is 2. For example, p may be 0, r may be 1 and q may be 2.

Examples of suitable dinitriles include 2-methylglutaronitrile, succinonitrile and adiponitrile.

As described above, the electrolyte also comprises a lithium salt. Suitable lithium salts include at least one of lithium hexafluorophosphate (LiPF$_6$), lithium hexafluoroarsenate (LiAsF$_6$), lithium perchlorate (LiClO$_4$), lithium trifluoromethanesulfonimide (LiN(CF$_3$SO$_2$)$_2$)), lithium borofluoride (LiBF$_4$), lithium trifluoromethanesulphonate (CF$_3$SO$_3$Li), and lithium bis(oxalato)borate (LiB(C$_2$O$_4$)$_2$). Preferably the lithium salt is lithium trifluoromethanesulfonimide (LiN(CF$_3$SO$_2$)$_2$)).

The concentration of lithium salt in the electrolyte is preferably 0.1 to 5M, more preferably 0.2 to 3M, for example, 0.4 to 2 M (e.g. 0.5 to 1M).

As discussed above, the lithium sulphur cell of the present invention includes an anode, a cathode, an electrolyte and, optionally, a porous separator. The latter may be positioned between the anode and the cathode. The anode is formed of lithium metal or a lithium metal alloy. Preferably, the anode is a metal foil electrode, such as a lithium foil electrode. The lithium foil is formed of lithium metal or lithium metal alloy.

The cathode of the cell includes a mixture of electroactive sulphur material and electroconductive material. This mixture forms an electroactive layer, which may be placed in contact with a current collector.

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Preferably, carbon black is employed.

The mixture of electroactive sulphur material and electroconductive material may be applied to the current collector in the form of a slurry in a solvent (e.g. water or an organic solvent). The solvent may then be removed and the resulting structure calendared to form a composite structure, which may be cut into the desired shape to form a cathode. A separator may be placed on the cathode and a lithium anode placed on the separator. Electrolyte may then be incorporated into the assembled cell to wet the cathode and separator.

Alternatively, following the formation of the cathode, the electrolyte may be coated onto the cathode. The separator may then be placed over the coated cathode, and the anode placed over the separator.

As mentioned above, electrolytes formed using dinitriles as solvent may also have favourable viscosity characteristics. Accordingly, such electrolytes can be applied to the cathode in a convenient and efficient manner, facilitating efficient and convenient cell assembly. In a preferred embodiment of the invention, electrolyte is incorporated into the cell assembly by coating the electrolyte on the cathode, placing the separator over the coated cathode and placing the anode over the separator. The coating may be carried out in any suitable way, for example by spraying, extruding, vacuum filling, pouring and/or spreading the electrolyte over the active sulphur material. After the electrolyte is incorporated into the cell assembly, the cell may be sealed e.g. in an enclosure. The enclosure may be water-tight and/or air-tight. Suitable enclosures include pouches.

Where a separator is employed, the separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Preferably, the porosity of the separator is 40-60%, more preferably 45-55%, for example 50%. Suitable separators include a mesh formed of a polymeric material. Suitable polymers include polypropylene, nylon and polyethylene. Non-woven polypropylene is particularly preferred. It is possible for a multi-layered separator to be employed.

Preferably, the separator is selected from non-woven polypropylene and polyethylene.

Preferably, the permeability of the separator is less than 300 Gurley, more preferably less than 250 Gurley, for example 200 Gurley.

The lithium sulphur cell of the present invention is a secondary cell. When the lithium-sulphur cell is discharged, the sulphur in the cathode is reduced in two-stages. In the first stage, the electroactive sulphur material (e.g. elemental sulphur) is reduced to polysulphide species, $S_n^{2-}$ ($n \geq 2$). These species are generally soluble in the electrolyte. In the second stage of discharge, the polysulphide species are reduced to lithium sulphide, $Li_2S$, which, typically, deposits on the surface of the anode.

When the cell is charged, the two-stage mechanism occurs in reverse, with the lithium sulphide being oxidised to lithium polysulphide and thereafter to lithium and sulphur. The electrolyte of the cell, therefore, may include polysulphide species dissolved in the dinitrile.

EXAMPLE 1

All electrolytes were prepared by dissolving lithium bis (trifluoromethylsulfonyl)imide salt (LiTFSI) into the solvents listed in the table below at a concentration of 0.5M. Electrolytes were then stirred at 30° C. for 1 h or until completely dissolved.

The electrolytes were then incorporated into cells assembled under dry room conditions (dew point <−50° C.). Cathode material was composed of sulfur, carbon black and polyethylene oxide binder (PEO) at a ratio of 70:10:20 (w/w), respectively. The cathode material was cast onto carbon-coated aluminium foil with a typical surface capacity of 1.9-2.0 mAh/cm². Cells were assembled by wetting the cathode with the electrolyte (3.5 μL/mAh/cm²), which was stacked in turn with a polypropylene separator(Celgard 3501) and 100 μm thick lithium foil anode.

Discharge-charge performances of the cells were evaluated in galvanostatic mode using a Maccor multi-channel cycler with a voltage range of 1.5-2.45 V at 30° C. The cells were discharged and charged at current densities of 0.2 C and 0.1 C, respectively.

Figure 2:
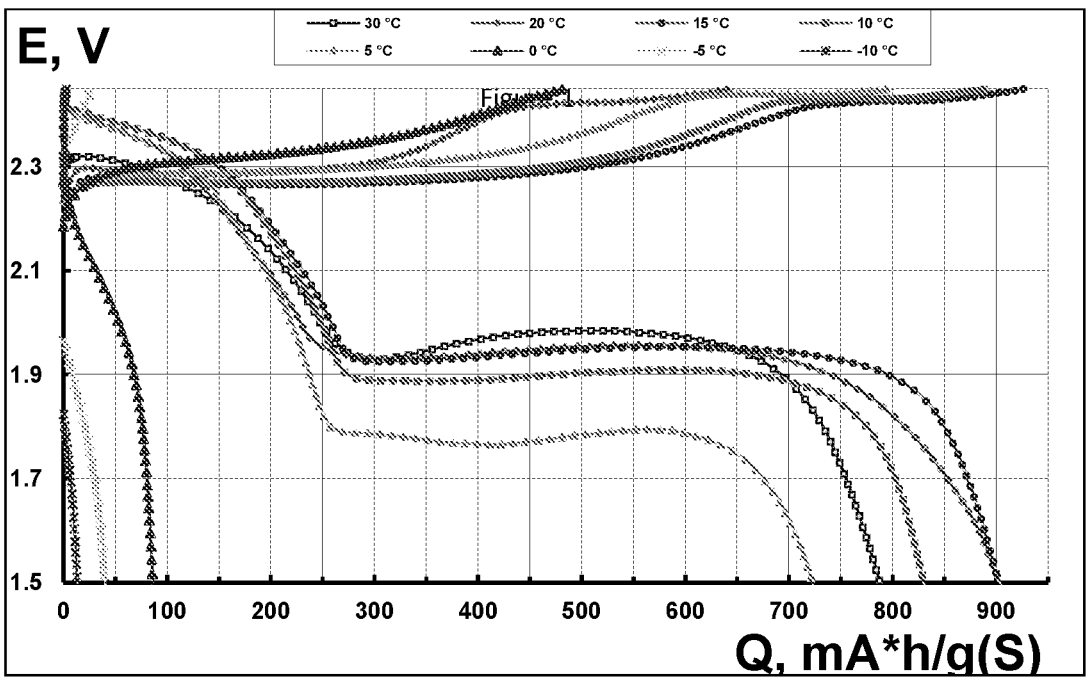
FIG. 2 depicts charge-discharge curves of a lithium sulphur cell formed using lithium LiTDI (4,5-dicyano-2-(trifluoromethyl)imidazolium) using sulfolane as an electrolyte solvent.

The table below shows the gravimetric energy density achieved with each cell. This was compared to a reference cell formed using 0.5M lithium bis(trifluoromethylsulfonyl) imide salt (LiTFSI) in sulfolane. As can be seen from the table, the cells formed using dinitriles as electrolyte solvents showed significantly improved gravimetric energy densities compared to the reference cell and cells formed using mononitriles as electrolyte solvents.

ranging from −10 to 30 degrees C. The charge-discharge curves at the various temperatures are shown in FIG. 1. A comparative cell was formed using sulfolane as an electrolyte solvent. The comparative charge-discharge curves are shown in FIG. 2. As can be seen from the figures, the cell formed using 2-MGN as an electrolyte solvent has a superior performance at low temperatures.

The invention claimed is:

1. A lithium-sulphur cell comprising:
an anode comprising lithium metal or lithium metal alloy;
a cathode comprising a mixture of electroactive sulphur material and solid electroconductive material. wherein the electroactive sulphur material is reduced to polysulfide species and/or lithium sufide during discharge of the lithium-sulphur cell, and wherein the solid electroconductive material consists essentially of carbon black, carbon fiber, carbon nanotubes, or mixtures thereof; and
a liquid electrolyte composition comprising at least one lithium salt, lithium polysulphides, and a dintrile;
wherein the dinitrile has the formula (II):

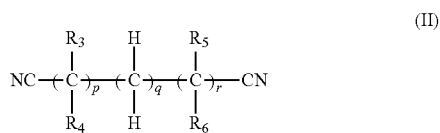

wherein:
p is 0 or 1,
q is an integer of 1 to 9,
r is 0 or 1, and
$R_3$, $R_4$, $R_5$ and $R_6$ are each independently selected from H and a $C_1$ to $C_6$ alkyl group, and wherein at least one of $R_3$ and $R_4$ is H and at least one of $R_5$ and $R_6$ is H; and
wherein the concentration of lithium salt in the liquid electrolyte composition is 0.2 M to 3M.

2. The cell of claim 1, wherein at least one of $R_3$, $R_4$, $R_5$ and $R_6$ is a $C_1$ to $C_6$ alkyl group.

3. The cell of claim 1, wherein p is 0 and r is 1.

4. The cell of claim 3, wherein q is 2.

5. The cell of claim 3, wherein at least one of $R_5$ and $R_6$ is H and the other is a $C_1$ to $C_6$ alkyl.

| Cell Composition | 0.5M LiTFSI in sulfolane | 0.5M LiTFSI in 2-MGN | 0.5M LiTFSI in 3-MPN | 0.5M LiTFSI in adiponitrile | 0.5M LiTFSI in 3-(dimethyl)aminopropionitrile | 0.5M LiTFSI in benzonitrile | 0.5M LiTFSI in glutaronitrile |
|---|---|---|---|---|---|---|---|
| Gravimetric Energy Density, Wh/kg | 173.40 | 192.16 | 177.72 | 199.73 | 151.10 | 95.96 | 190.61 |
| % of standard (gravimetric energy density) | 100.00% | 110.82% | 102.49% | 115.18% | 87.14% | 55.34% | 109.93% |

MPN = 3-methoxypropionitrile
MGN = 2-methylglutaronitrile

EXAMPLE 2

A lithium sulphur cell formed using lithium LiTDI (4,5-dicyano-2-(trifluoromethyl)imidazolium) in 2-methylglutaronitrile as an electrolyte was cycled at temperatures 6. The cell of claim 1, wherein the $C_1$ to $C_6$ alkyl group is methyl.

7. The cell of claim 1, wherein the dinitrile is selected from at least one of 2-methylglutaronitrile, succinonitrile and adiponitrile.

8. The cell of claim 1, wherein the electroactive sulphur material comprises elemental sulphur.

9. The cell of claim 1, wherein the solid electroconductive material comprises carbon.

10. The cell of claim 1, wherein the solid electroconductive material consists essentially of carbon black, carbon fiber, or carbon nanotubes.

11. The cell of claim 1, wherein the solid electroconductive material consists essentially of carbon black.

12. The cell of claim 1, wherein the solid electroconductive material consists of carbon black, carbon fiber, or carbon nanotubes.

13. The cell of claim 1, wherein the solid electroconductive material consists of carbon black.

14. The cell of claim 1, wherein the concentration of lithium salt in the liquid electrolyte composition is 0.4 M to 2M.

15. The cell of claim 1, wherein the concentration of lithium salt in the liquid electrolyte composition is 0.5 M to 1M.

16. The lithium-sulphur cell of claim 1, wherein the electroactive sulphur material comprises elemental sulphur or a sulphur-based inorganic compound that is reduced to polysulfide species and/or lithium sufide during discharge of the lithium-sulphur cell.

* * * * *

UNITED STATES PATENT AND TRADEMARK OFFICE
CERTIFICATE OF CORRECTION

PATENT NO. : 10,811,728 B2
APPLICATION NO. : 15/315133
DATED : October 20, 2020
INVENTOR(S) : Sebastian Desilani, Ashley Cooke and Gregory Schmidt It is certified that error appears in the above-identified patent and that said Letters Patent is hereby corrected as shown below:

Claim 1, Column 6, Line 12, please delete "." and insert --,--.
Claim 1, Column 6, Line 14, please delete "sufide" and insert --sulfide--.
Claim 1, Column 6, Line 20, please delete "dintrile" and insert --dinitrile--.
Claim 16, Column 7, Line 24, please delete "sufide" and insert --sulfide--.

Signed and Sealed this
Twenty-ninth Day of December, 2020

Andrei Iancu
*Director of the United States Patent and Trademark Office*